United States Patent
Kitajima et al.

(10) Patent No.: US 6,823,069 B1
(45) Date of Patent: *Nov. 23, 2004

(54) ENCRYPTING/DECRYPTING SYSTEM WITH PROGRAMMABLE LOGIC DEVICE/UNIT AND METHOD THEREOF

(75) Inventors: Hironobu Kitajima, Kawasaki (JP); Shunsuke Fueki, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 805 days.

(21) Appl. No.: 08/814,409

(22) Filed: Mar. 11, 1997

(30) Foreign Application Priority Data

Aug. 9, 1996 (JP) ............................................. 8-211227

(51) Int. Cl.[7] .................................................. H04L 9/00
(52) U.S. Cl. ........................................................ 380/44
(58) Field of Search .......................................... 380/21

(56) References Cited

U.S. PATENT DOCUMENTS

| | | | |
|---|---|---|---|
| 4,386,234 A | * 5/1983 | Ehrsam et al. | 178/22.09 |
| 4,914,697 A | * 4/1990 | Dabbish et al. | 380/28 |
| 4,972,478 A | * 11/1990 | Dabbish | 380/28 |
| 5,111,504 A | * 5/1992 | Esserman et al. | 380/21 |
| 5,345,508 A | * 9/1994 | Lynn et al. | 380/46 |
| 5,388,157 A | * 2/1995 | Austin | 380/21 |
| 5,499,192 A | * 3/1996 | Knapp et al. | 364/489 |
| 5,623,637 A | * 4/1997 | Jones et al. | 395/491 |
| 5,703,950 A | * 12/1997 | Jovanovich et al. | 380/23 |
| 5,768,372 A | * 6/1998 | Sung et al. | 380/3 |

FOREIGN PATENT DOCUMENTS

| | | |
|---|---|---|
| JP | 60-203036 | 10/1985 |
| JP | 62-012227 | 1/1987 |
| JP | 3-500117 | 1/1991 |
| JP | 05-022281 | 1/1993 |
| JP | 05-067965 | 3/1993 |
| JP | 05-233844 | 9/1993 |
| JP | 06-216897 | 8/1994 |
| JP | 07-336328 | 12/1995 |
| JP | 08-076974 | 3/1996 |

* cited by examiner

*Primary Examiner*—Douglas J. Meislahn
(74) *Attorney, Agent, or Firm*—Staas & Halsey LLP

(57) ABSTRACT

When information about an encrypting/decrypting method is received, it is complied with a library. A mapping data object that represents the structure of the circuit is generated. The mapping data object is written to a programmable logic device/unit. When the programmable logic device/unit is used for an encrypting/decrypting circuit, an encrypting/decrypting system that can flexibly change an algorithm at high speed can be accomplished.

29 Claims, 17 Drawing Sheets

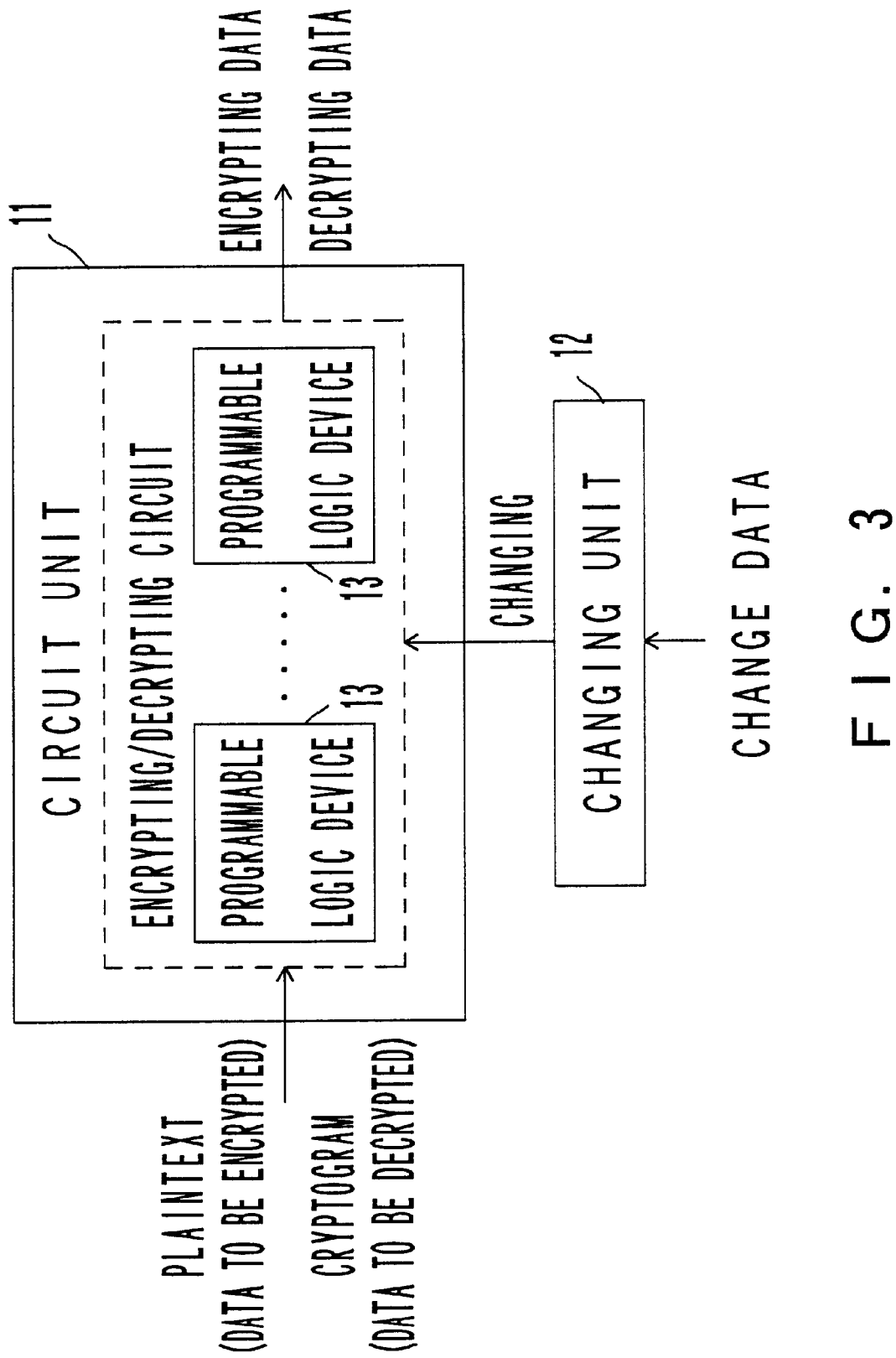
F I G. 3

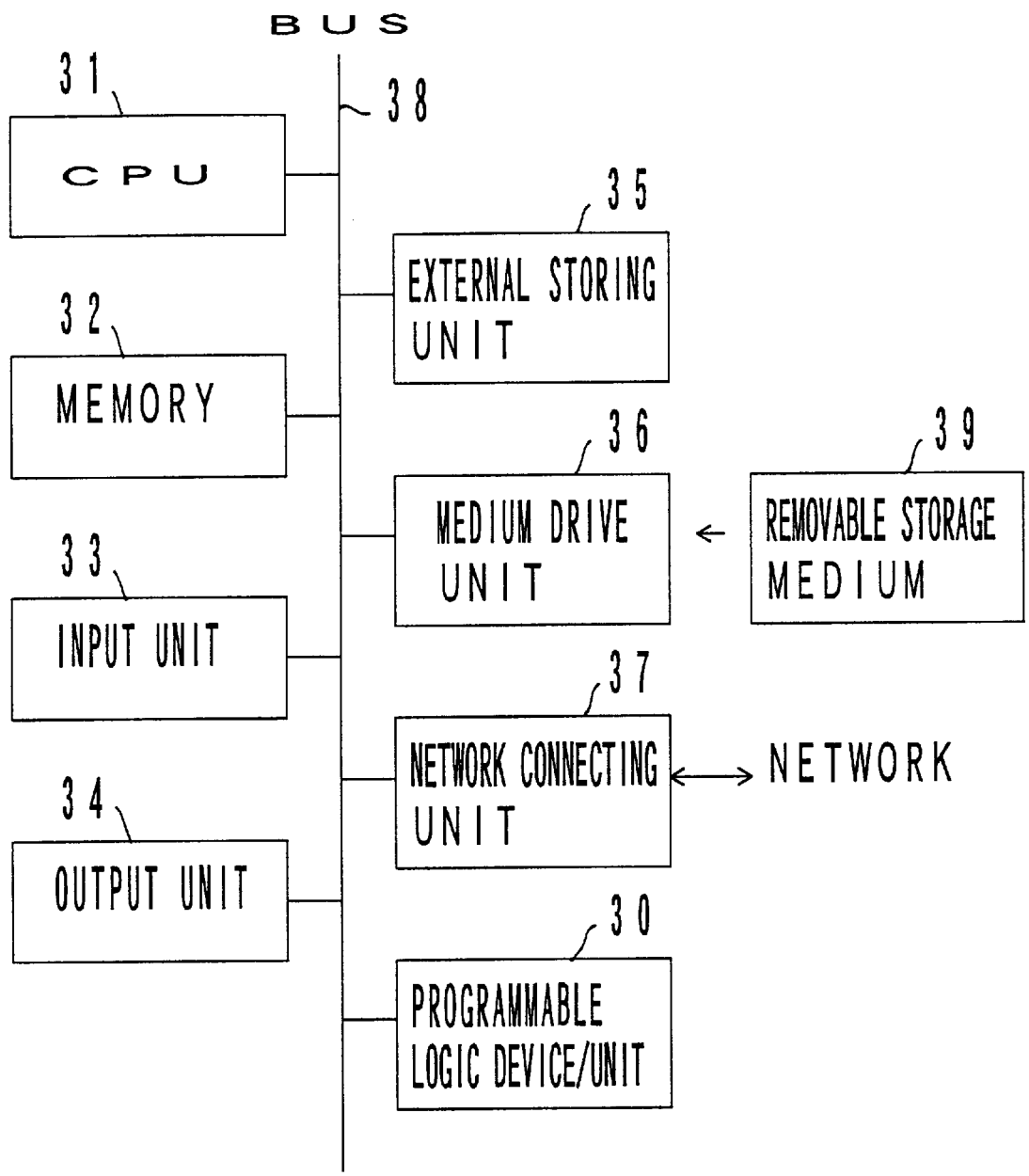
F I G. 5

```
module Bcount16(q, clk)
  output [15:0] q;
  input clk;
  reg [15:0] q;

always@(posedge clk)
    q=q+ d1;
endmodule
```

FIG. 6

```
module top;
    reg clock, reset, start, end;
L1— wire [b1:0] M, C;    <-15
L2— wire [b2:0] e;       <- 7
L3— wire [b3:0] n;       <-63 rsaEnc  enc1(M, C, e, n, clock, reset, start, end);

endmodule module rsaEnc(M, C, e, n, clk, res, st, ed);
    input [b1:0] M;   <-15
    input [b2:0] e;   <- 7
    input [b3:0] n;   <-63
    input clk, res, st;
    output [b1:0] C; <-15
    output ed;
{
    integer i;
    always@(posedge clk)
    if (res == 1'b1)
        C = 16'd0;
    else if (st == 1'b1)
            C = 1'b1;
            for (i=0;i<e;i++) {
                C=(M*C)%n;
            }
            ed=1'b1;
}
endmodule
```

FIG. 7

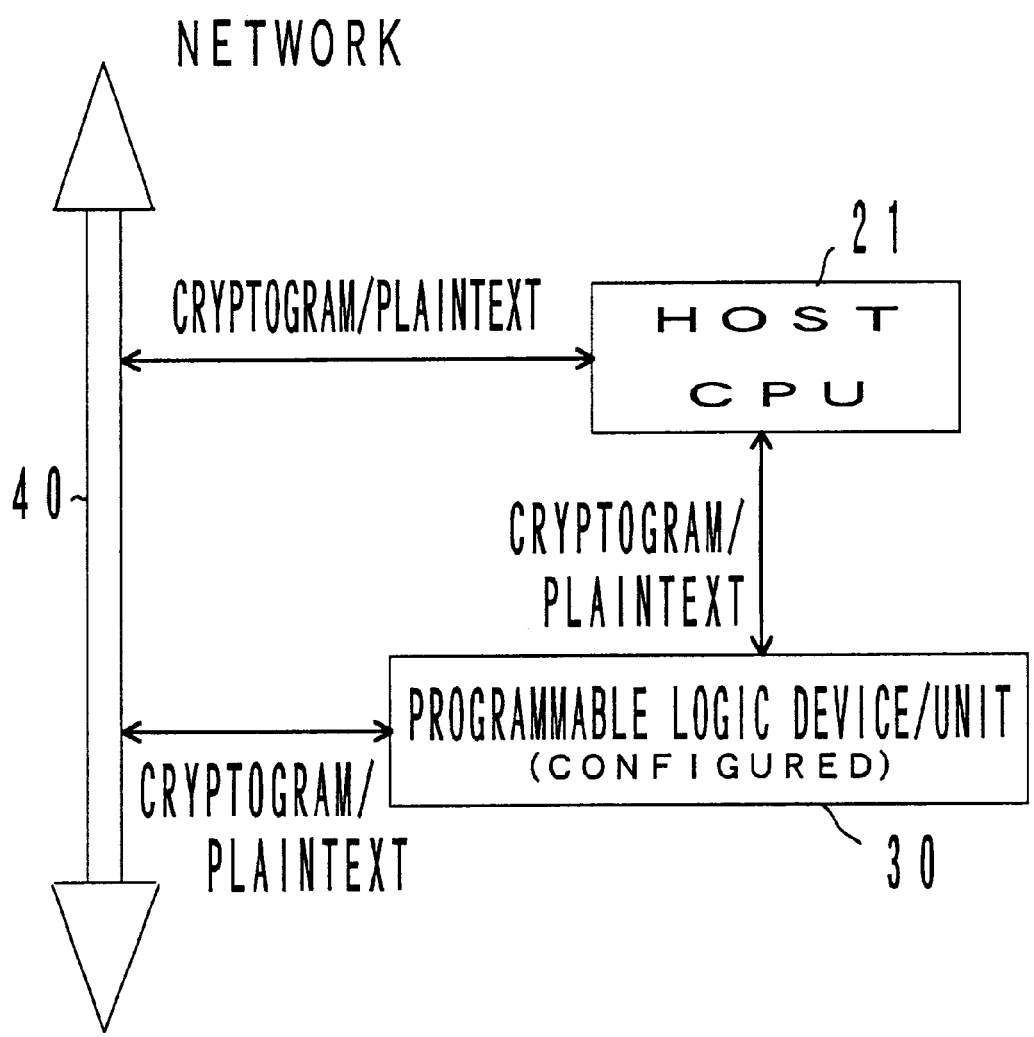
F I G. 9

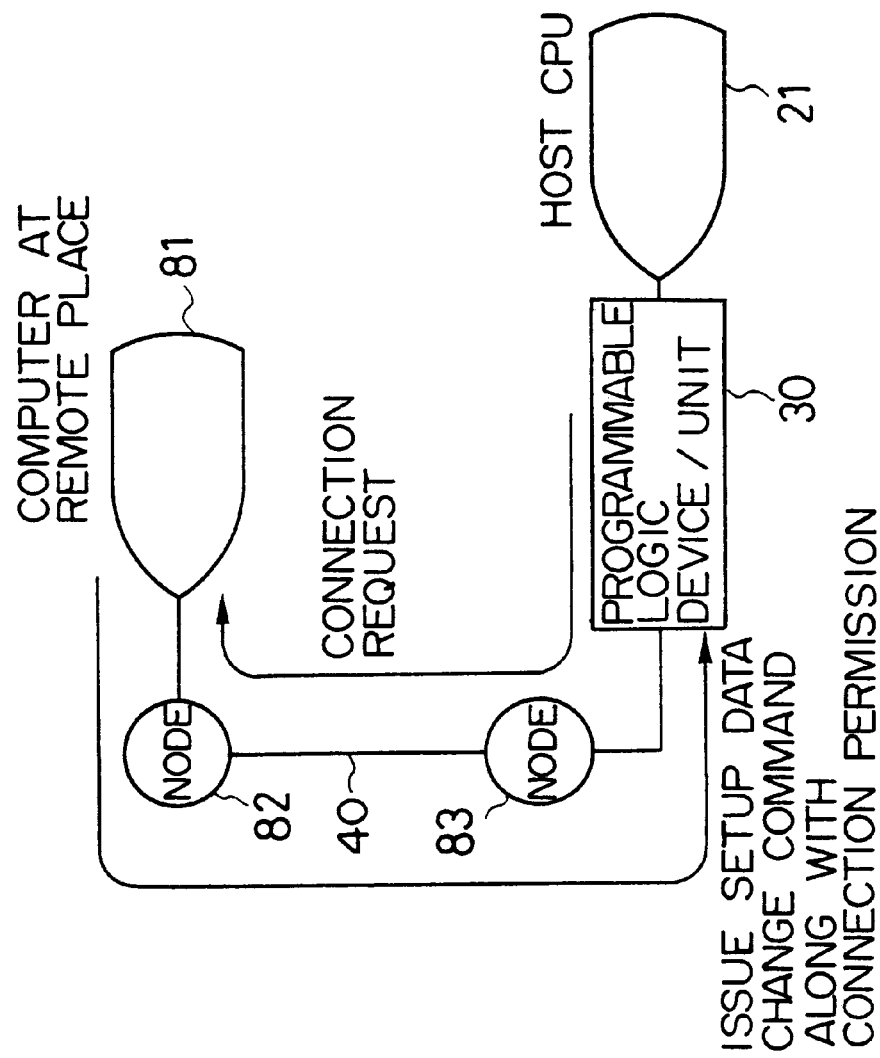
F I G. 15

ENCRYPTING/DECRYPTING SYSTEM WITH PROGRAMMABLE LOGIC DEVICE/UNIT AND METHOD THEREOF

BACKGROUND OF THE INVENTION

1. Field of the Invention

The present invention relates to an encrypting technology that is widely used for encrypting a file and/or a mail and securing information such as a qualification of a message and/or a user, in particular, to an encrypting system for encrypting information, a decrypting system for decrypting encrypted information, and an encrypting/decrypting method.

2. Description of the Related Art

Currently used encrypting technologies can be roughly categorized as secret key encrypting technologies and public key encrypting technologies.

Among these technologies, DES (Data Encryption Standard) encrypting technology and RSA (Rived-Shamir-Adleman) encrypting technology will be exemplified.

The DES technology is a typical secret key encrypting algorithm standard that has been used mainly in the United States. In the DES encrypting algorithm, digitized plaintext data is divided into fixed length blocks (of for example, 64 bits). By calculating each block with a secret key, the plaintext is encrypted. The bit length of the secret key is the same as the bit length of the plaintext that is data to be encrypted.

FIG. 1 is a schematic diagram showing a DES encrypting algorithm in the case that the block length is 64 bits. In FIG. 1, a 64-bit encrypting key is performed to contraction transposing 1 and then supplied to a first stage processing. The contraction transposing 1 means to transpose all except a part of input data. In contrast, a transposing means to substitute part of input data.

The transposed encrypting key is divided into a first half portion and a second half portion. The first half portion and the second half portion are supplied to respective circulation shifting 2. The circulation shifting 2 means cyclically to shift input data leftward or rightward. After circulation shifting 2, the data is performed to contraction transposing 3.

After transposing 4, a 64-bit plaintext is divided into a first half portion and a second half portion. The first half portion and the second half portion are input to the first stage process. One of the divided portions is performed to a non-linear transforming 5. The non-linear transforming 5 non-linearly transforms the data with the encrypting key that has been performed the contraction transposing 3. After the non-linear transforming 5, the data is added to another divided portion in adding 6. This process is repeated up to m-th stage. Output data of the m-th stage process is performed to a transposing 7. After the transposing 7, a 64-bit cryptogram is generated.

Although the DES decrypting algorithm is almost the same as that of the DES encrypting algorithm shown in FIG. 1, the circulation shifting 2 shift data in the reverse direction of the DES encrypting algorithm.

Next, RSA encrypting algorithm will be described.

The RSA encrypting algorithm is a very strong public key encrypting algorithm that can not only encrypt data, but also qualify a message and/or a user. This algorithm uses two keys that are a public key (encrypting key) and a secret key (decrypting key). The public key is open to the public as a document or data on a network so that any user can access it. On the other hand, the secret key should be strictly controlled by the owner thereof.

The RSA encrypting algorithm employs mathematical calculations due to the fact that it is very difficult to factorize very large integral numbers.

FIG. 2 is a schematic diagram showing RSA encrypting/decrypting algorithms. In FIG. 2, an encrypting key (e, n) used in an encrypting 8 is composed of predetermined integers e and n that are open to the public. A decrypting key (d, n) used in a decrypting 9 is composed of integers n and d, where n is the same of the encrypting key, but d is kept secret. These integers are defined corresponding to the following formula.

$$n = p \cdot q \tag{1}$$

$$e \cdot d \equiv 1 (mod((p-1) \cdot (q-1))) \tag{2}$$

where p and q are prime numbers; mod is a modulo; A(mod B)=C represents that the remainder of which A is divided by B is C (in other words, (A−C) is a multiple of B). Thus, formula (2) means that (e·d−1) can be divided by (p−1)·(q−1). The relation of (e<n) is satisfied. Moreover, e and (p−1)·(q−1) are relatively prime.

In the encrypting 8, a plaintext is converted to M into a cryptogram C that satisfies the following congruence.

$$C \equiv M^e (mod\ n) \tag{3}$$

In other words, the e-th power of the plaintext M is obtained. The result is divided by n and the remainder C is obtained as the cryptogram. In the decrypting 9, the cryptogram C is decrypted to the plaintext M that satisfies the following congruence.

$$M \equiv C^d (mod\ n) \tag{4}$$

In other words, the d-th power of the cryptogram C is obtained. The result is divided by n and the remainder is obtained as the plaintext M.

To decrypt the cryptogram C, it is necessary to know the value of the secret key d. To do that, n should be factorized into prime factors to obtain prime numbers p and q. However, when n is a very large number, with the power of a current computer, it cannot be factorized in prime factors within a practical processing time.

However, the conventional encrypting/decrypting technologies have the following problem.

In such strong encrypting algorithms, since complicated calculations are performed with an encrypting key having a relatively long bit length, it takes a long processing time. Thus, when the encrypting/decrypting algorithms are installed as software tools, they are limited to small-scaled data processes. In particular, such algorithms are not practically used for processes on real-time basis performed between information processing units connected through a network.

To solve such a problem, chips that accomplish the above-described encrypting algorithms as hardware tools have been released. However, since available algorithms, the bit length of encrypting key, and so forth are limited, the chips lack flexibility.

In particular, the block length of DES algorithms, the bit length of the encrypting key of RSA algorithms, and so forth strongly relate to the power of the encrypting algorithms. When they are insufficient, cryptograms can be encrypted with techniques and powerful computer operations by unauthorized people. To assure the security of the cryptograms, sufficient setup values should be employed corresponding to the degree of security and the computer power at the time.

SUMMARY OF THE INVENTION

An object of the present invention is to provide an encrypting/decrypting system and an encrypting/decrypting method thereof that allows an encrypting/decrypting algorithm to be flexibly changed corresponding to required conditions such as degree of security and that can operate at high speed.

An encrypting/decrypting system according to the present invention has a circuit unit and a changing unit.

The circuit unit includes at least one programmable logic device. With the programmable logic device, the circuit unit forms a circuit corresponding to given encrypting/decrypting specifications.

The changing unit reads change data for changing the encrypting/decrypting specifications and automatically changes the circuit corresponding to the change data.

Using an existing mapping data object or a mapping data object generated by compiling a library, as a mapping data object that represents the structure of the circuit, the changing unit changes the circuits by writing the mapping data object to the programmable logic device.

The encrypting/decrypting system according to the present invention may have a communication network connecting unit that connects the system to a communication network so as to receive the change data from the network.

According to the encrypting/decrypting system of the present invention, since the encrypting/decrypting circuit can be changed, the specifications of the encrypting/decrypting circuit can be dynamically and automatically changed corresponding to the degree of security and the application. When the specifications are periodically changed, the security of cryptograms are further improved.

In addition, since data is encrypted/decrypted by hardware, the process can be more quickly performed than by a system using a software tool.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 3 is a schematic diagram showing the theory of an encrypting/decrypting system according to the present invention;

FIG. 5 is a block diagram showing the structure of an information processing apparatus;

FIG. 6 is a program list showing an example of a library;

FIG. 7 is a program list showing an example of an encrypting algorithm file;

FIG. 9 is a schematic diagram showing an execution phase;

FIG. 15 is a schematic diagram showing an updating method for specifications corresponding to a command;

DESCRIPTION OF THE PREFERRED EMBODIMENT

FIG. 3 is a schematic diagram showing the theory of an encrypting/decrypting system according to the present invention. The encrypting/decrypting system shown in FIG. 3 has a circuit unit 11 and a changing unit 12.

The circuit unit 11 includes at least one programmable logic device 13. With the programmable logic device 13, the circuit unit 11 forms an encrypting/decrypting circuit corresponding to given encrypting/decrypting specifications.

The changing unit 12 reads change data for changing the encrypting/decrypting specifications and automatically changes the encrypting/decrypting circuit.

The programmable logic device 13 is for example an FPGA (Field Programmable Gate Array). The circuit unit 11 reads the specifications of the programmable logic device 13 as a mapping data object or the like that represents the internal structure thereof and forms an encrypting/decrypting circuit corresponding to the encrypting/decrypting specifications.

The changing unit 12 reads the change data as a mapping data object and dynamically affects the change data to the programmable logic device 13 so as to change positions of gates, lines, and so forth of the encrypting/decrypting circuit.

The changed encrypting/decrypting circuit converts input data (plaintext/cryptogram) into cryptogram/plaintext corresponding to the changed specifications.

According to the encrypting/decrypting system, since the internal structure of the encrypting/decrypting circuit can be changed, the specifications of the encrypting/decrypting circuit can be dynamically changed corresponding to the degree of security and the application. In addition, the specifications are automatically changed corresponding to the given change data.

In the case that the changing unit 12 has a function for automatically generating a mapping data object, when the type of the encrypting/decrypting algorithm and so forth are designated as change data, the specifications of the encrypting/decrypting circuit can be automatically changed.

Thus, even if the user is not familiar with designing circuits, he or she can easily change the encrypting/decrypting circuit. Thus, the system with flexibility is accomplished. Moreover, since the encrypting/decrypting operation is executed by hardware, the apparatus can operate much more quickly than the process accomplished by a software tool.

Figure 1:
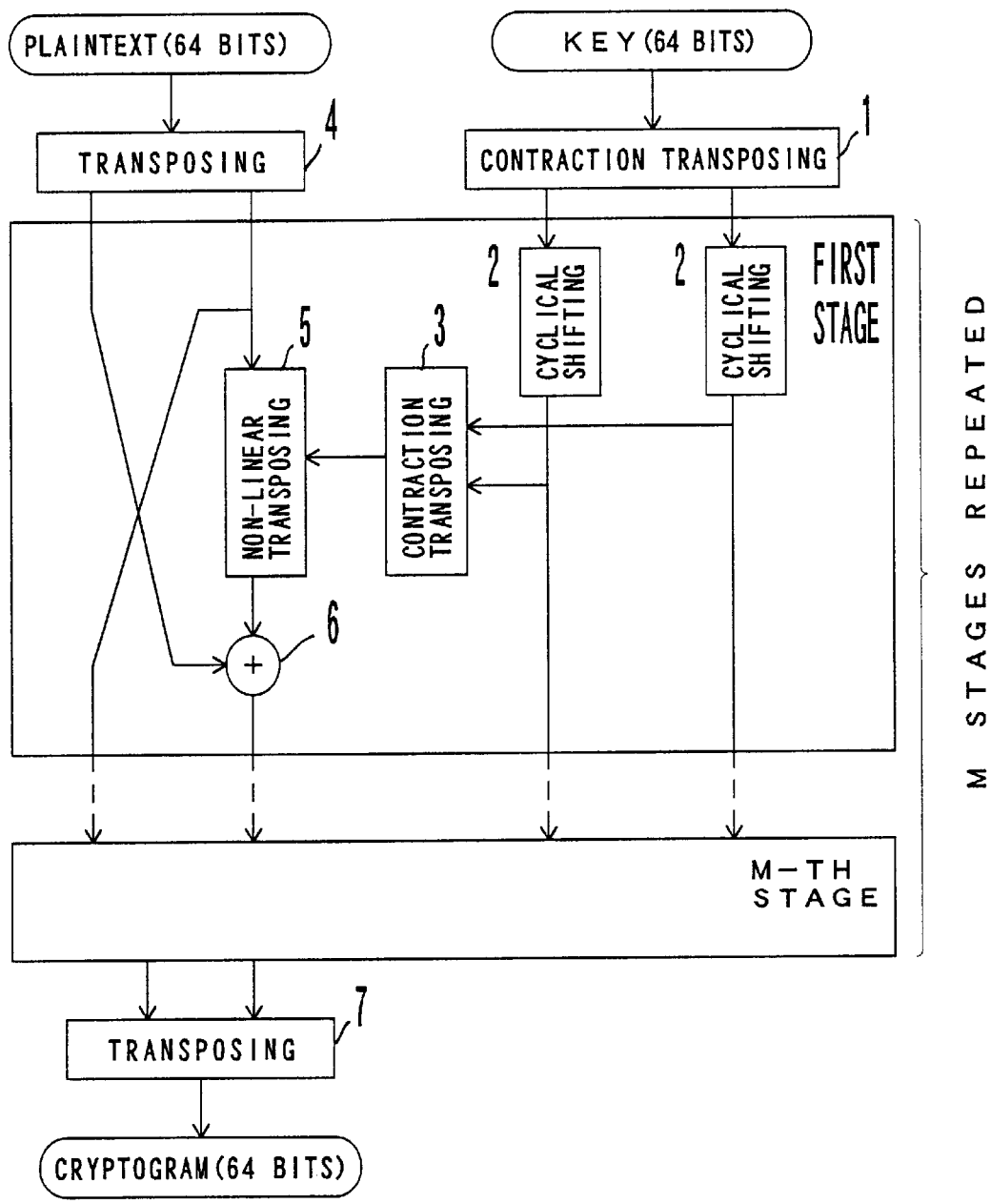
FIG. 1 is a schematic diagram showing a DES algorithm.
Figure 2:
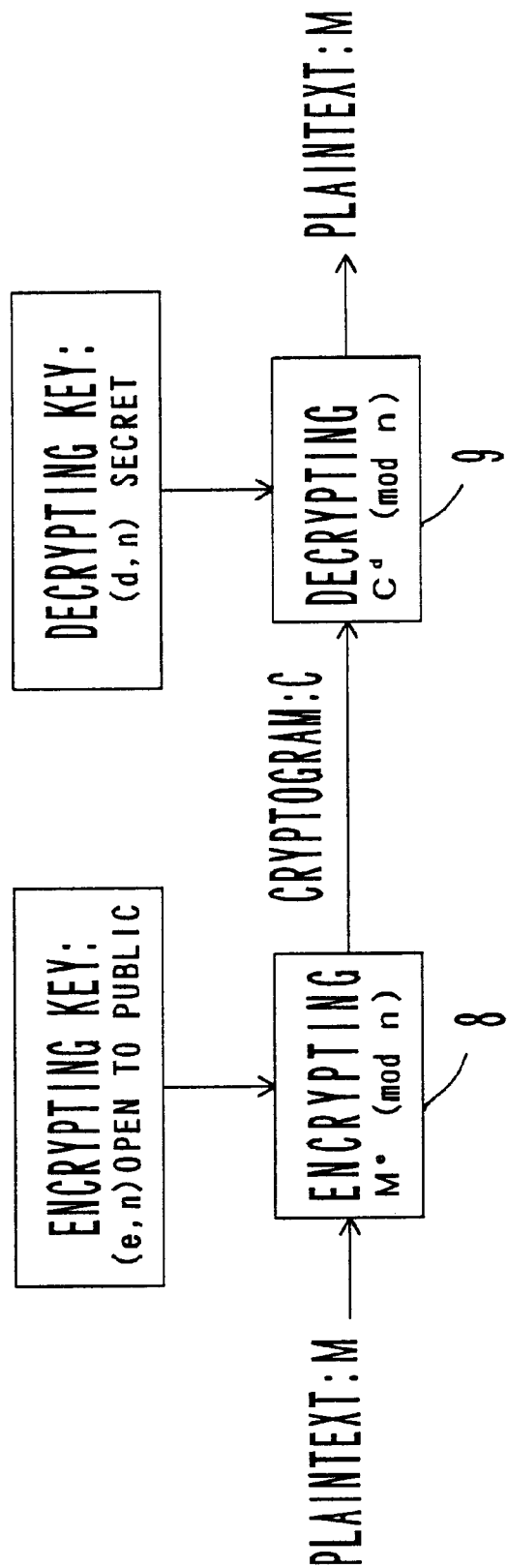
FIG. 2 is a schematic diagram showing a RSA algorithm.
Figure 4:
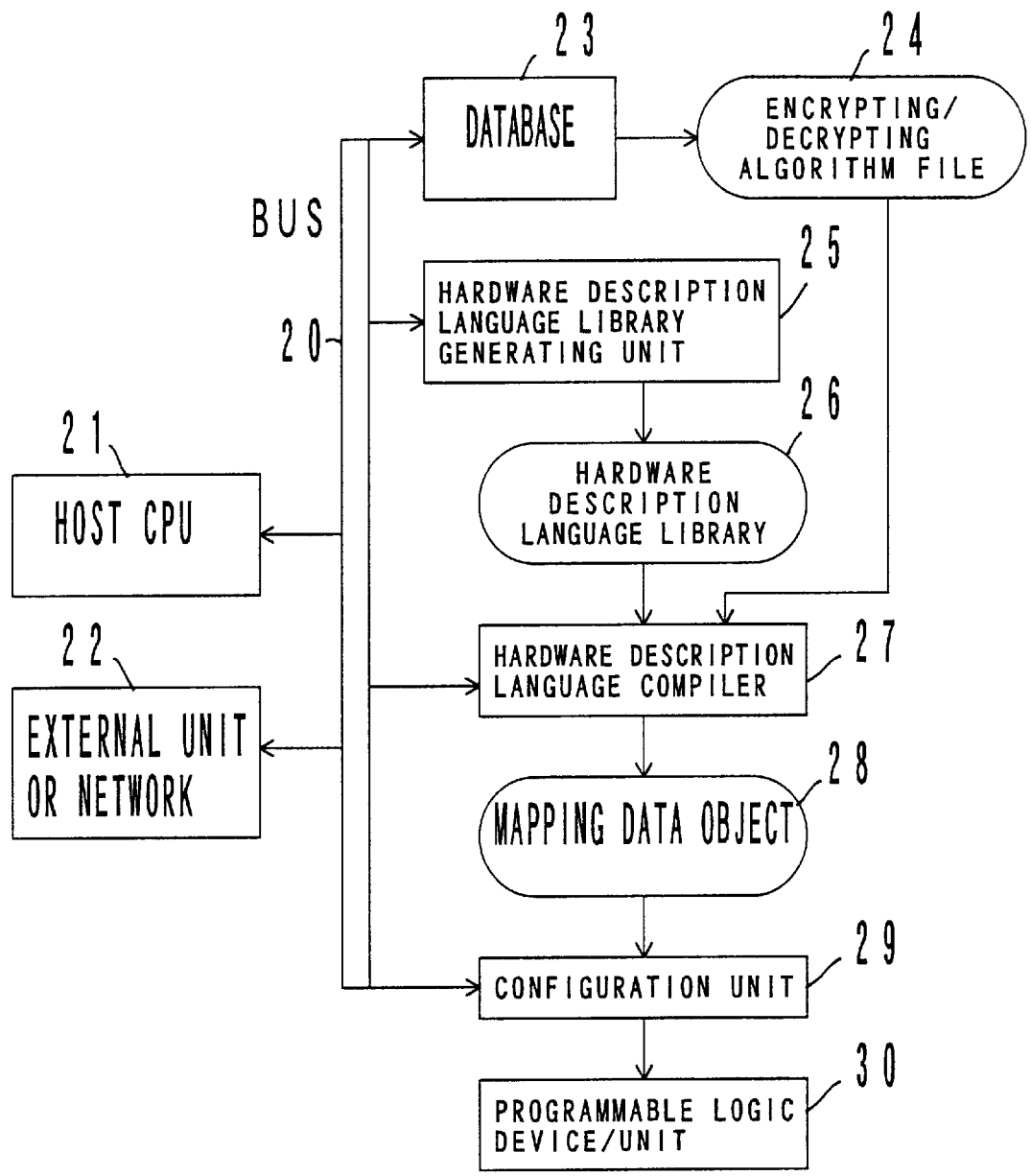
FIG. 4 is a schematic diagram showing the structure of the encrypting/decrypting system according to an embodiment.

The circuit unit 11 shown in FIG. 3 is equivalent to a programmable logic device/unit 30 and a peripheral circuit (not shown) thereof shown in FIG. 4. The changing unit 12 is equivalent to a host CPU (Central Processing Unit) 21, a hardware description language library generating unit 25, a hardware description language compiler 27, and a configuration unit 29.

Next, with reference to the accompanying drawings, an embodiment of the present invention will be described.

With a programmable logic device/unit such as an FPGA, the encrypting/decrypting system according to the present invention accommodates encrypting/decrypting algorithms. In this example, the logic device means one semiconductor chip. The logical unit means a wiring board or a unit that includes two or more semiconductor chips. The programmable logic device/unit means a logic device/unit that the user can produce in a short time with an activator and a design software tool.

According to the present invention, in addition to the FPGA, any programmable logic device/unit such as a PLD (Programmable Logic Device) whose circuit scale is 1/10 of the FPGA, a PLA (Programmable Logic Device), and an ASIC (Application Specific Integrated Circuit) can be used.

Such programmable logic devices/logic units have two types: in the first type, logic circuits have connected in the fabrication stage, in the second type, logic circuits are connected by the user. In the present invention, the second type is used.

Since the user can form/change the inner logic of the programmable logic device/unit, the specifications of the encrypting/decrypting system can be dynamically changed with existing mapping data, through a network, or automatically. Thus, the user can customize the encrypting/decrypting system corresponding the degree of security and application of data.

With such a system, an encrypting/decrypting system that is dynamically applicable for a plurality of algorithms and a plurality of bit lengths of block and key can be accomplished. Since the apparatus is accomplished by hardware, when data is encrypted or decrypted, huge data can be processed and data can be processed on real-time basis.

FIG. 4 is a schematic diagram showing the structure of such an encrypting/decrypting system. The encrypting/decrypting system shown in FIG. 4 comprises a host CPU 21, a database 23, a hardware description language library generating unit 25, a hardware description language compiler 27, a configuration unit 29, a programmable logic device/unit 30, and a bus 20 that connects each unit. The encrypting/decrypting system shown in FIG. 4 has two operation phases that are a configuration phase and an execution phase.

In the configuration phase, when the user inputs a command for forming a particular encrypting/decrypting circuit, the hardware description language compiler 27 extracts a relevant encrypting/decrypting algorithm as an encrypting/decrypting algorithm file 24 written in hardware description language (HDL) from the database 23. The command for forming the encrypting/decrypting circuit can be received from an external unit or through a network 22.

The hardware description language (HDL) is a language for describing the structure of the programmable logic device/unit 30. The HDL is categorized as a VHDL (VHSIC-HDL: Very High-Speed Integrated Circuit Hardware Description Language) and a Velilog-HDL that is a modification thereof. For example, pin numbers and functions (logics) of the programmable logic device/unit 30 are described in the hardware description language.

Next, the hardware description language compiler 27 compiles the encrypting/decrypting algorithm file 24 with a hardware description language library 26 generated by the hardware description language library generating unit 25 and forms a mapping data object 28.

The mapping data object 28 is composed of a bit sequence of binary data that represents the positions of gates and lines thereof in the programmable logic device/unit 30. When an FPGA is used, binary data corresponding to the technology is used. When the binary data is downloaded to the FPGA, a predetermined function corresponding to the binary data is set.

The configuration unit 29 writes the mapping data object 28 to the programmable logic device/unit 30. As a result, lines and logics are formed, and a particular encrypting/decrypting circuit corresponding to the user's command is formed.

In this embodiment, the functions of the hardware description language library generating unit 25, the hardware description language compiler 27, and the configuration unit 29 are accomplished by a program executed by the host CPU 21.

FIG. 5 is a schematic diagram showing the structure of an information processing apparatus that accomplishes the encrypting/decrypting system shown in FIG. 4. The information processing apparatus shown in FIG. 5 comprises a CPU 31, a memory 32, an input unit 33, an output unit 34, an external storing unit 35, a medium drive unit 36, a network connecting unit 37, and a bus 38 that mutually connects each unit.

The CPU 31 is equivalent to the host CPU 21. The CPU 31 executes a program stored in the memory 32 and accomplishes the hardware description language library generating unit 25, the hardware description language compiler 27, and the configuration unit 29. The memory 32 is composed of, for example, a ROM (Read Only Memory), a RAM (Random Access Memory), and so forth.

The input unit 33 is equivalent to, for example, a keyboard, a pointing device, and so forth. The input unit 33 is used to input a user's command. The output unit 34 is equivalent to a display unit, a printer, and so forth. The output unit 34 is used to output messages and processed results.

The external storing unit 35 is equivalent to, for example, a magnetic disk unit, an optical disc unit, a magneto-optic disc unit, and so forth. The external storing unit 35 stores programs and data. In addition, the external storing unit 35 is used as a database 23 that stores the encrypting/decrypting algorithm file 24, the hardware description language library 26, and the mapping data object 28.

The medium drive unit 36 drives a removable storage medium 39 and accesses data stored thereon. The removable storage medium 39 is for example a memory card, a floppy disk, a CD-ROM (Compact Disc Read-Only Memory), an optical disc, and a magneto-optic disc. Any of storage medium from which a computer can read data can be used. In addition to data, the removable storage medium 39 stores a program for executing the process for the encrypting/decrypting system shown in FIG. 4.

The network connecting unit 37 is connected to any communication network such as LAN (Local Area Network) and converts data exchanged through the communication network. The encrypting/decrypting system can receive data and programs from an external information processing apparatus through the network connecting unit 37.

When the DES encrypting/decrypting algorithms are installed, 16/32/64 bit adding devices, 16/32/64 bit subtracting devices, 8/16/32/64/128 bit registers, 8/16/32/64/128 bit left/right shift registers, 16/32/64/128 bit increment counters, 16/32/64/128 bit decrement counters, 16/32/64 bit DES function generators, a clock circuit, OR circuits, and AND circuits have been formed and stored in the database 23 as the basic logic hardware description language library 26.

As an example, a 16-bit decrement counter is described in the Velilog-HDL as shown in FIG. 6. The description of hardware description language library 26 shown FIG. 6 is described that count value q is incremented at each leading edge of the clock signal.

When the RSA encrypting/decrypting algorithms are installed, 16/32/64/128 bit multiplying devices, 16/32/64 bit adding devices, 16/32/64 bit subtracting devices, 8/16/32/64/128 bit registers, 16/32/64/128 bit increment counters, 16/32/64/128 bit decrement counters, a clock circuit, OR circuits, and AND circuits have been formed and stored in the database 23 as the basic logic hardware description language library 26.

When the user inputs a command for a configuration to the encrypting/decrypting system shown in FIG. 4, setup data such as the type of the encrypting/decrypting algorithm, the bit length of encrypting/decrypting keys, and so forth should be designated as a command.

When the RSA encrypting algorithm is used, RSA is designated as the type of the algorithm. In addition, the bit length of the encrypting key (e, n) and the value thereof are set. In the Velilog-HDL, since the bit width wire of each line is required as a numeric value, the host CPU 21 generates the numeric value and embeds it in a code of the encrypting algorithm file 24.

FIG. 7 is a program list showing an example of the encrypting algorithm file 24 in which a numeric value of the bit width has been embedded. In the file shown in FIG. 7, the bit width (b1=15) of the plaintext M and the cryptogram C, the bit width (b2=7) of the encrypting key e, and the bit width (b3=63) of the encrypting key n are placed on lines L1, L2, and L3, respectively.

The hardware description language compiler 27 composes the hardware description language library 26 selected corresponding to the line information, corresponding to the description encrypting algorithm file 24 and generates a mapping data object 28.

Figure 8:
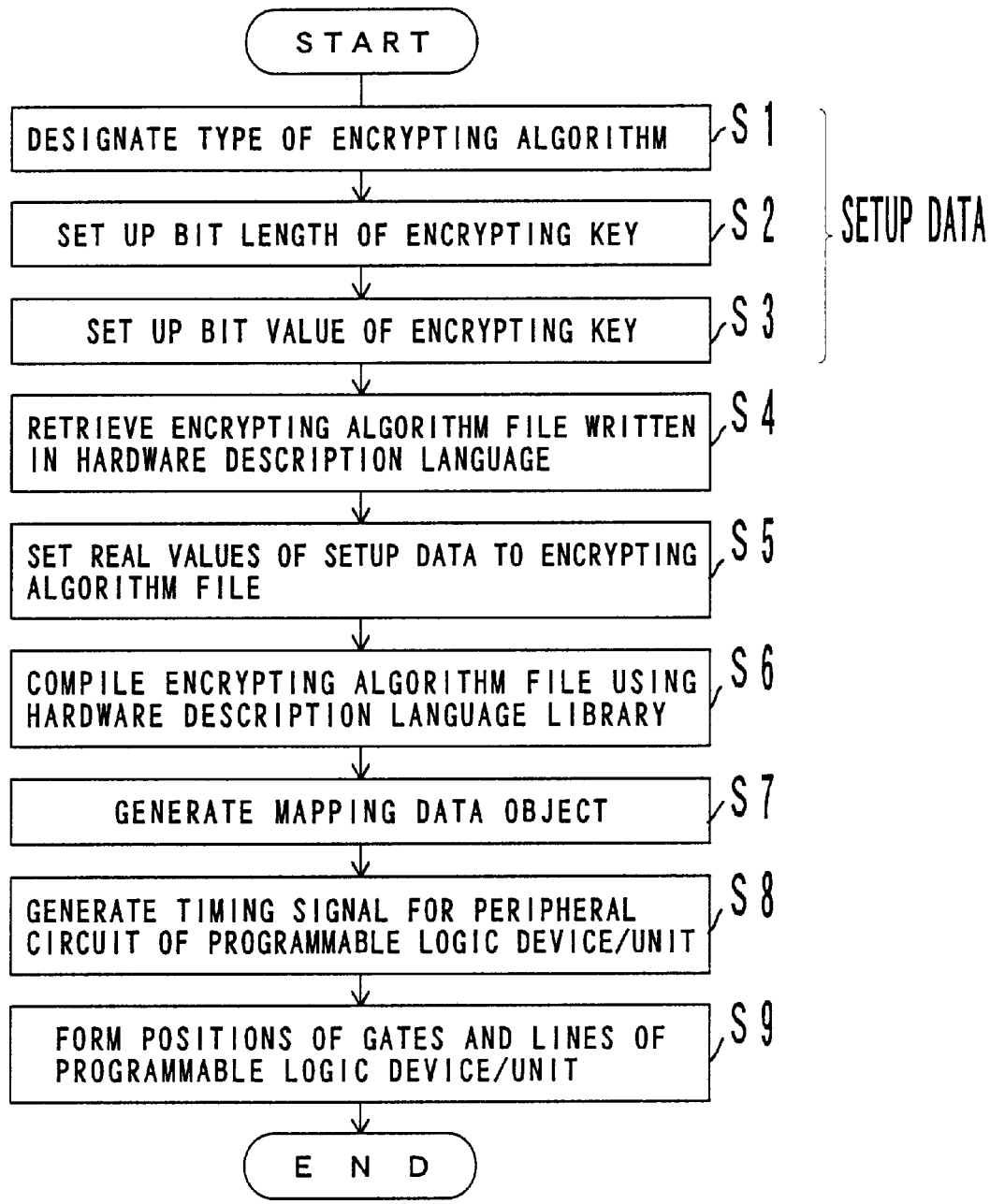
FIG. 8 is a flow chart showing a process in a configuration phase.

Next, with reference to FIG. 8, a process for forming the encrypting/decrypting circuit in the configuration phase will be described. FIG. 8 is a flow chart showing the process mainly for forming a RSA encrypting circuit corresponding to setup data supplied from the outside. This process also applies fundamentally for a process for forming another encrypting/decrypting circuit.

When the process shown in FIG. 8 is started, the hardware description language compiler 27 sets the type of the designated encrypting algorithm, the bit length of the encrypting key, and the value thereof as setup data (at steps S1, S2, and S3) and automatically retrieves a relevant encrypting algorithm file 24 written in the hardware description language from the database 23 (at step S4). The hardware description language compiler 27 sets real values of the setup data to variable codes of the retrieved encrypting algorithm file 24 (at step S5).

Next, with the hardware description language library 26, the hardware description language compiler 27 compiles the encrypting algorithm file 24 (at step S6). Thus, the positions of gates and lines in the programmable logic device/unit 30 are optimized and a mapping data object 28 of a predetermined encrypting circuit designated by the setup data is generated (at step S7).

Next, the configuration unit 29 generates a timing signal of the peripheral circuit (not shown) of the programmable logic device/unit 30 (at step S8) and downloads the mapping data object 28 to the programmable logic device/unit 30. Thus, the positions of gates and lines of the programmable logic device/unit 30 have been formed (at step S9) and the process is completed.

Thus, in the configuration phase, since the programmable logic device/unit 30 can be automatically programmed with simple setup data, even a user who is not familiar with designing circuits can form an encrypting/decrypting circuit. In addition, since a designer does not need to design the entire circuit with a design software tool, he or she can form an encrypting/decrypting circuit in a short time.

In the process shown in FIG. 8, the specifications of the encrypting/decrypting circuit are automatically generated corresponding to setup data supplied from the outside. However, the specifications may be changed in another method. For example, an encrypting/decrypting algorithm file 24 that includes real values such as the bit length of an encrypting key may have been prepared. The encrypting/decrypting algorithm file 24 can be compiled. Alternatively, the specifications can be changed by compiling an existing hardware description language library 26 stored in the database 23 without need to use the encrypting/decrypting algorithm file 24. In addition, by directly downloading an existing mapping data object 28, the specifications can be changed. Moreover, the specifications of the encrypting/decrypting circuit can be changed with the hardware description language library 26 and the mapping data object 28 read through the network.

Information used to change the specifications of the encrypting/decrypting circuit such as the setup data, the encrypting/decrypting algorithm file 24, the hardware description language library 26, and the mapping data object 28 is equivalent to the above-described change data.

On the other hand, in the execution phase, as shown in FIG. 9, a programmable logic device/unit 30 receives a plaintext/cryptogram from a host CPU 21 or a network 40 and encrypts/decrypts plaintext/cryptogram. The obtained cryptogram/plaintext is output to the host CPU 21 or the network 40.

The programmable logic device/unit 30 inputs or outputs data directly or via the host CPU 21 to the network 40 corresponding to a predetermined protocol such as TCP/IP (Transmission Control Protocol/Internet Protocol). When data is directly input/output, the programmable logic device/unit 30 is connected to the network 40 through TCP/IP control hardware (not shown).

The programmable logic device/unit 30 shown in FIG. 9 is a hardware circuit that encrypts/decrypts the plaintext/cryptogram corresponding to the specifications of the setup data. The hardware circuit executes the encrypting/decrypting process much quicker than the encrypting/decrypting process using a software tool. Thus, the programmable logic device/unit 30 is suitable for a real-time process for data exchanged with the network 40.

Next, with reference to FIGS. 10 to 13, an example of the encrypting/decrypting circuit formed by the programmable logic device/unit 30 will be described.

Figure 10:
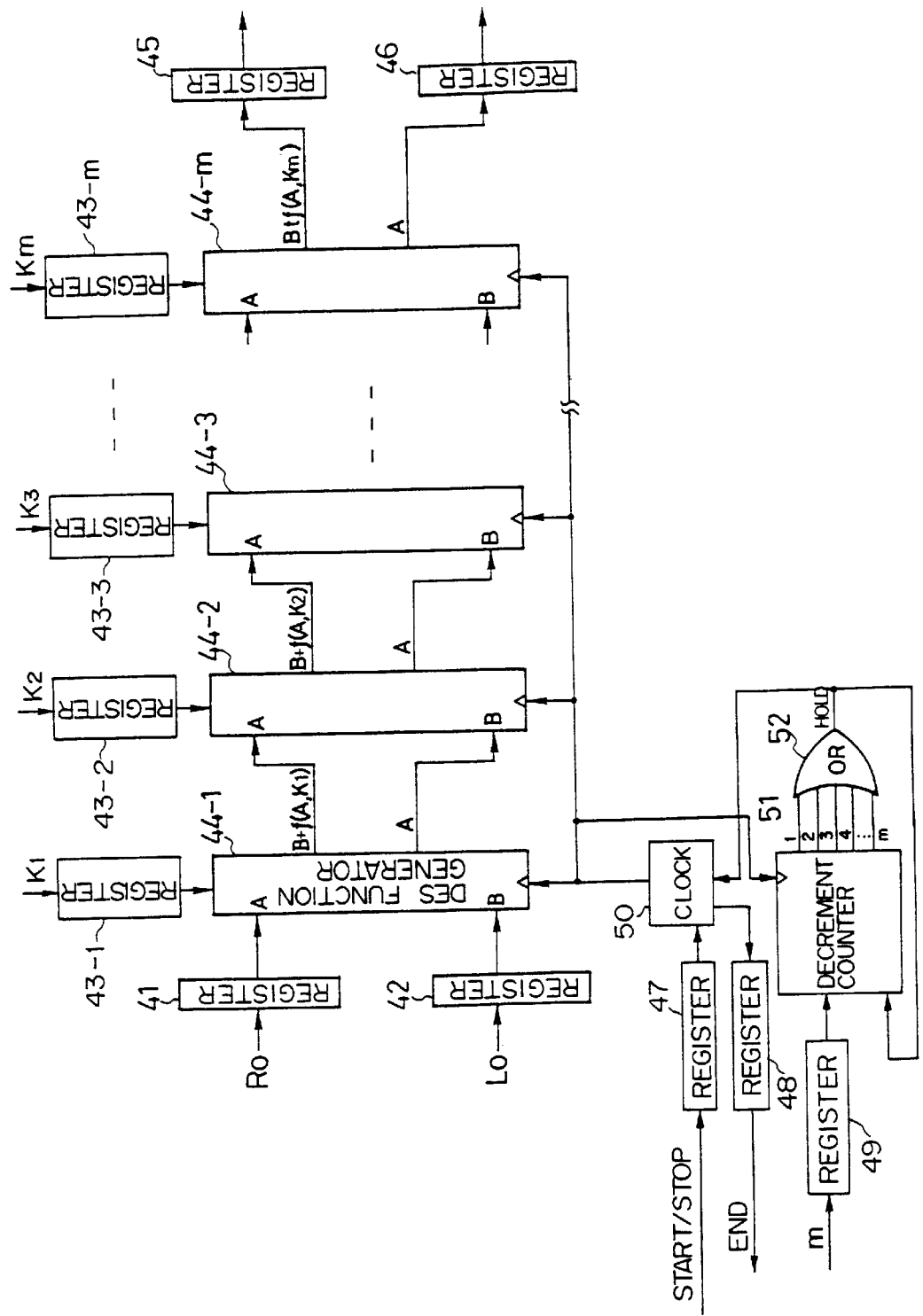
FIG. 10 is a schematic diagram showing a DES encrypting circuit (No. 1)
Figure 11:
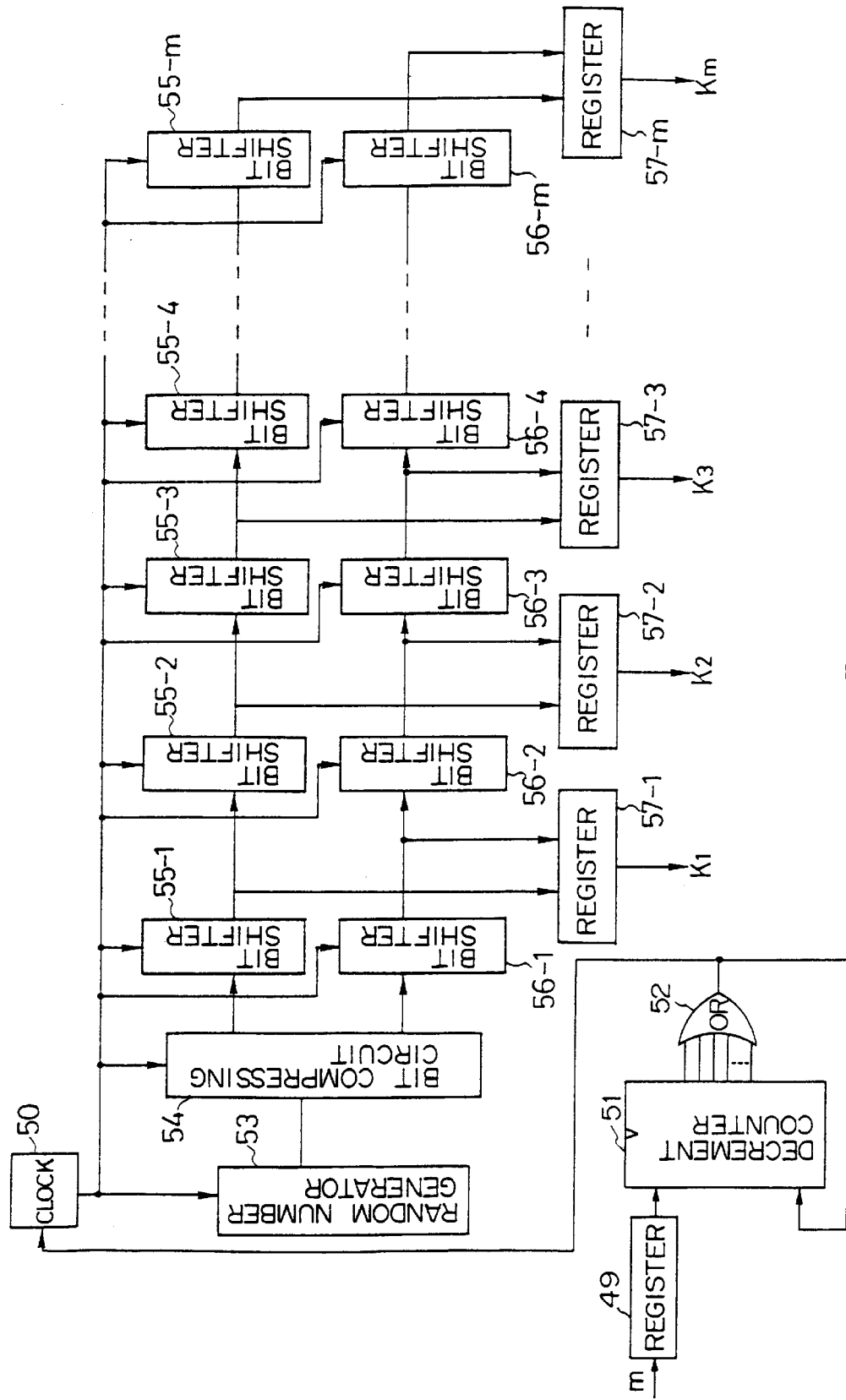
FIG. 11 is a schematic diagram showing a DES encrypting circuit (No. 2)

FIGS. 10 and 11 show an example of a DES encrypting circuit. FIG. 10 is a schematic diagram showing a circuit that generates a control timing signal and converts a plaintext. FIG. 11 is a circuit that converts an encrypting key.

In the configuration phase, as input/output areas, as shown in FIG. 10, registers 41 and 42 to which input character data $R_0$ and $L_0$ are set and a register 49 to which the number of repetitive stages m for the encrypting process are set are formed. In addition, a register 47 to which a START/STOP signal that causes the process to be started or stopped is set, a register 48 which notices an END flag that represents the end of the process, and registers 45 and 46 to which character data that has been encrypted corresponding to a DES algorithm is set are formed.

As internal circuits, to accomplish the DES encrypting algorithm, registers 43-1, 43-2, ..., 43-$m$ to which $m$ encrypting keys $K_1$, $K_2$, ..., $K_m$ are set, DES function generators 44-1, 44-2, ..., 44-$m$, a clock circuit 50, a decrement counter 51, and an OR circuit 52 are defined.

As shown in FIG. 11, a random number generator 53 that generates a random number corresponding to an encrypting key, a bit compressing circuit 54 that perform a contraction transposing process, bit shifters 55-1, 55-2, ..., 55-$m$, 56-1, 56-2, ..., 56-$m$, and registers 57-1, 57-2, ..., 57-$m$ to which shifted encrypting keys are set are also defined.

In the execution phase, the number of repetitive stages $m$ is set to the register 49. Input character data $R_0$ and $L_0$ are set to the registers 41 and 42, respectively. In addition, the START/STOP signal is placed in the START state. Thus, the clock circuit 50 generates a clock signal. The clock signal is supplied to the decrement counter 51, the DES function generator 44-$i$ (hereinafter i=1, ..., m), the random number generator 53, the bit compressing circuit 54, and the bit shifters 55-$i$ and 56-$i$.

When the decrement counter 51 counts the number of repetitive stages m, it outputs a value 0 and the signal level of the HOLD signal that is output to the OR circuit 52 varies from 1 to 0. Thus, the clock circuit 50 and the decrement counter 51 stop.

The bit compressing circuit 54 decreases the bit length of random numbers that the random number generator 53 generate. The bit shifters 55-$i$ and 56-$i$ shift compressed random numbers in synchronization with the clock signal and set the resultant data to the register 57-$i$. The DES function generator 44-$i$ performs calculations using the encrypting key $K_i$ with the sequential pipeline structure in synchronization with the clock signal and sets encrypted character data to the registers 45 and 46 after m clock cycles.

The structure of the DES decrypting circuit is the same as the structure of the encrypting circuit shown in FIGS. 10 and 11. The encrypted character data is input and the character data of the plaintext is output.

Figure 12:
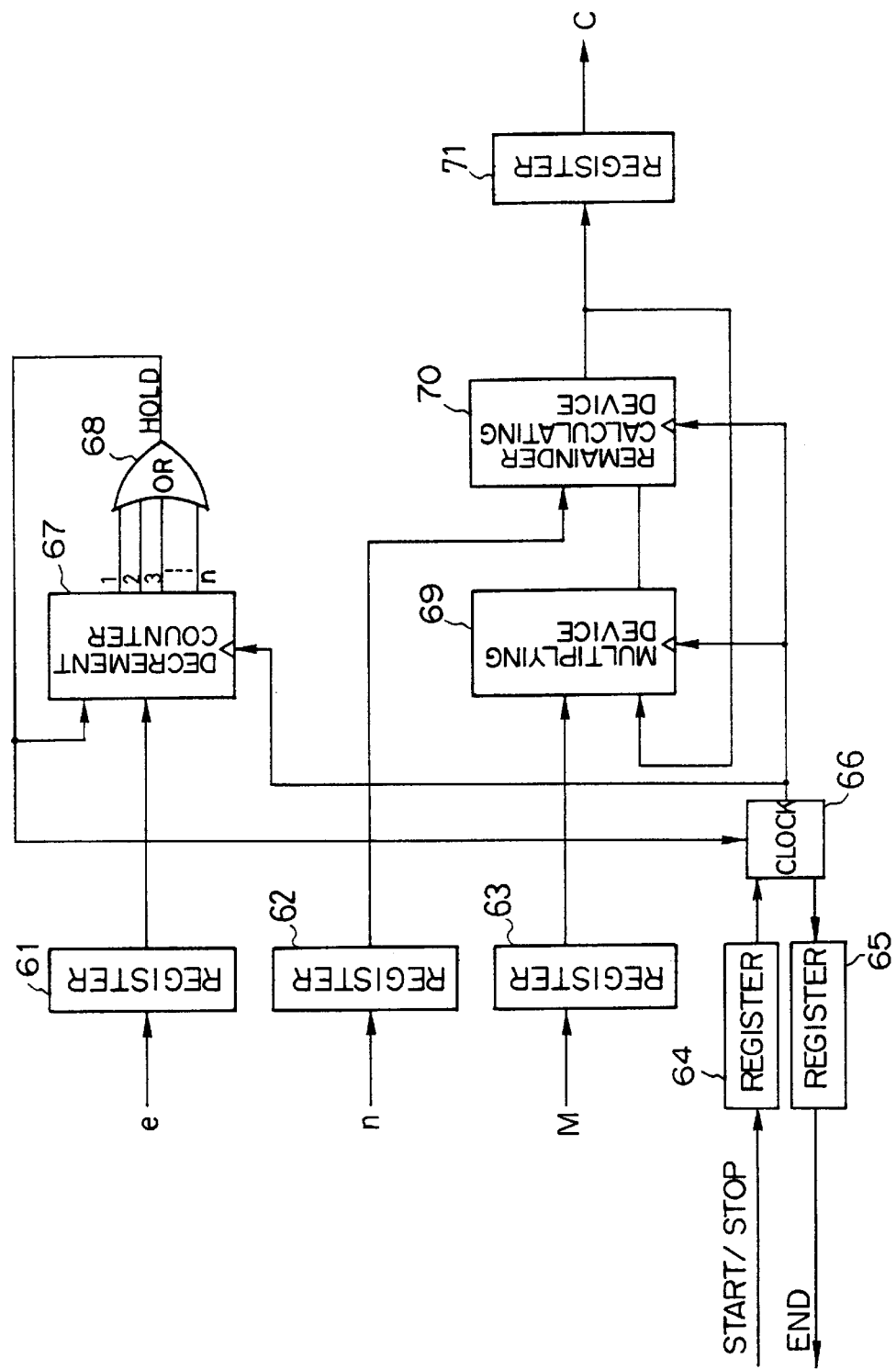
FIG. 12 is a schematic diagram showing a RSA encrypting circuit.

FIG. 12 shows an example of the RSA encrypting circuit. In the configuration phase of the RSA encrypting, a register 61 to which a public encrypting key e is set, a register 62 to which a public encrypting key n is set, and a register 63 to which an input plaintext M is set are formed as input/output areas. In addition, a register 64 to which the START/STOP signal that causes the process to start/stop is set, a register 65 which notices the END flag that represents the end of the process, and a register 71 to which the encrypted plaintext C corresponding the RSA encrypting process is set are also formed.

On the other hand, to accomplish the RSA algorithm, as internal circuits, a clock circuit 66, a decrement counter 67, an OR circuit 68, a multiplying circuit 69, and a remainder calculating device 70 are defined.

In the execution phase, the encrypting key e is set to the register 61. The encrypting key n is set to the register 62. The plaintext M is set to the register 63. The START/STOP signal is placed in the START state. Thus, the clock circuit 66 generates a clock signal and supplies it to the decrement counter 67, the multiplying device 69, and the remainder calculating device 70.

When the decrement counter 67 counts the value of the encrypting key e, it outputs a value 0 and the signal level of the HOLD signal that the OR circuit 68 outputs varies from 1 to 0. Thus, both the clock circuit 66 and the decrement counter 67 stop. The decrement counter 67 can count up to the maximum n.

The multiplying device 69 and the remainder calculating device 70 perform a sequence of calculations equivalent to the formula (3) in synchronization with the clock signal. $M^e(\bmod\ n)$ of the right side of the formula (3) is treated as the remainder of which $M^e$ is divided by n. However, $M^e$ can be obtained by the following expansion:

$$M^0(\bmod\ n)=1$$
$$M^1(\bmod\ n)=(M^0(\bmod\ n)\cdot M)(\bmod\ n)$$
$$M^2(\bmod\ n)=(M^1(\bmod\ n)\cdot M)(\bmod\ n)$$
$$\ldots$$
$$M^{e-1}(\bmod\ n)=(M^{e-2}(\bmod\ n)\cdot M)(\bmod\ n)$$
$$M^e(\bmod\ n)=(M^{e-1}(\bmod\ n)\cdot M)(\bmod\ n) \qquad (5)$$

The right side of the formula (5) means the remainder of which the value of the just preceding expression is multiplied by M and then divided by n. The multiplying device 69 and the remainder calculating device 70 shown in FIG. 12 operate until the decrement counter 67 counts the value of e and the signal level of the HOLD signal becomes 0 (namely, they operate e times corresponding to the formula (5)). Finally, $M^e(\bmod\ n)$ is output. Thus, the cryptogram C is generated.

Figure 13:
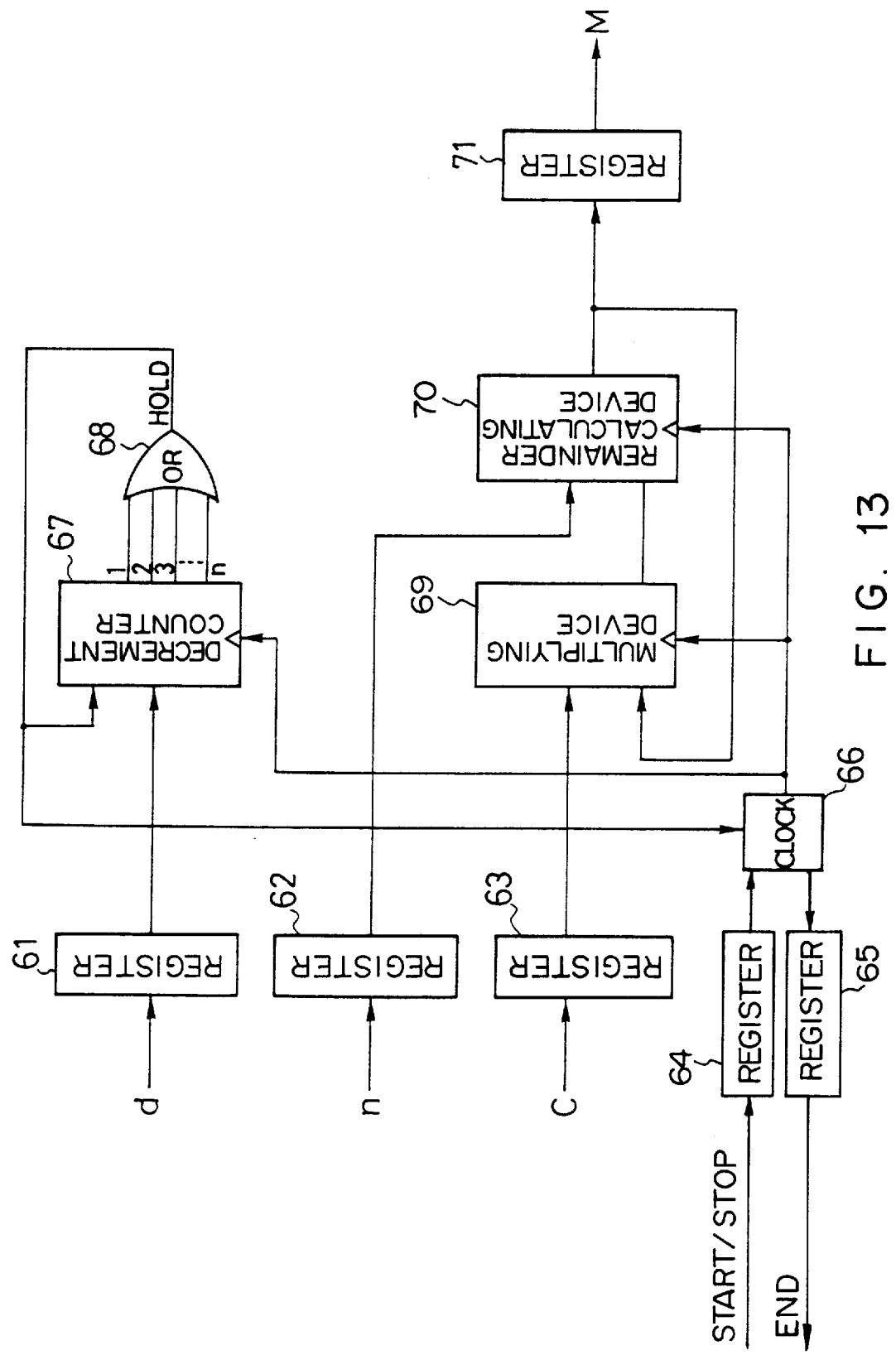
FIG. 13 is a schematic diagram showing a RSA decrypting circuit.

In the configuration phase of the RSA decrypting process, a decrypting circuit as shown in FIG. 13 is formed. Although the decrypting circuit shown in FIG. 13 is similar to the encrypting circuit shown in FIG. 12, in the circuit shown in FIG. 13, decrypting keys d and n and a cryptogram C instead of the encrypting keys e and n and the plaintext M are input to registers 61, 62, and 63, respectively. In addition, the plaintext M instead of the cryptogram C is output from the register 71. The operation of the decrypting circuit in the execution phase is the same as the encrypting circuit shown in FIG. 12.

In the above-described embodiment, a combination of a programmable logic device/unit such as an FPGA and a hardware description language was exemplified. However, the present invention is not limited to such a structure. Instead, the present invention can be applied for another structure that is a combination of a device/unit of which circuit connections can be changed corresponding to external information and a thing of which their change can be commanded. For example, depending on the type of the algorithm used in the encrypting/decrypting system, part or all of the programmable logic device 13 as the circuit unit 11 shown in FIG. 3 can be substituted with a relay switch. The switching operation of the relay switch as part of the changing unit 12 can be accomplished by a software tool corresponding to the specifications of the algorithm.

Next, with reference to FIGS. 14 to 17, application examples of the encrypting/decrypting system according to the present invention will be described.

Figure 14:
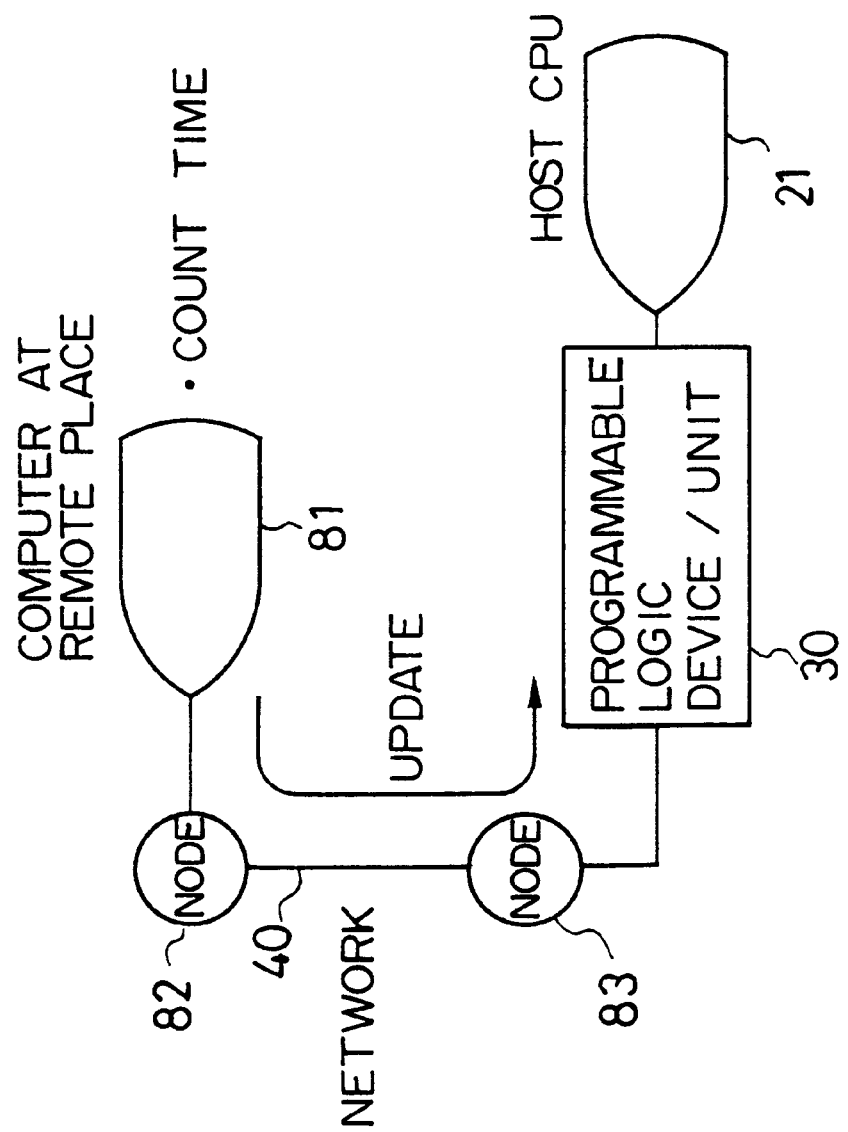
FIG. 14 is a schematic diagram showing a periodical updating method of specifications.

FIG. 14 shows a method for periodically updating the specifications of the encrypting/decrypting system. In FIG. 14, a programmable logic device/unit 30 is connected to a computer 81 disposed at a remote place through a network 40. Nodes 82 and 83 are relaying computers, repeaters, and so forth disposed on the network 40.

The computer 81 counts time using a timer. The host computer 81 periodically sends a setup data change command to the host CPU 21. Thus, the host CPU 21 changes the setup data, re-executes the configuration phase, and changes the function of the encrypting/decrypting system. At this point, for example, the algorithm and keys are updated. Instead of the computer 81 at remote place, the host CPU 21 or another stand-alone CPU can count time.

With such a system, the specifications of the encrypting/decrypting system can be periodically changed. Thus, cryptograms can be more securely protected against unauthorized people.

FIG. 15 shows a method for updating the specifications of the encrypting/decrypting system in the system structure shown in FIG. 14 corresponding to an external request. In FIG. 15, when a connection request of the host computer CPU 21 is sent to the computer 81 at a remote place, a setup data change command is sent from the computer 81 to the host CPU 21 along with a connection permission. Thus, the host CPU 21 changes the setup data, re-executes the configuration phase, and changes the function of the encrypting/decrypting system.

With such a system, the specifications of the encrypting/decrypting system can be externally updated.

Figure 16:
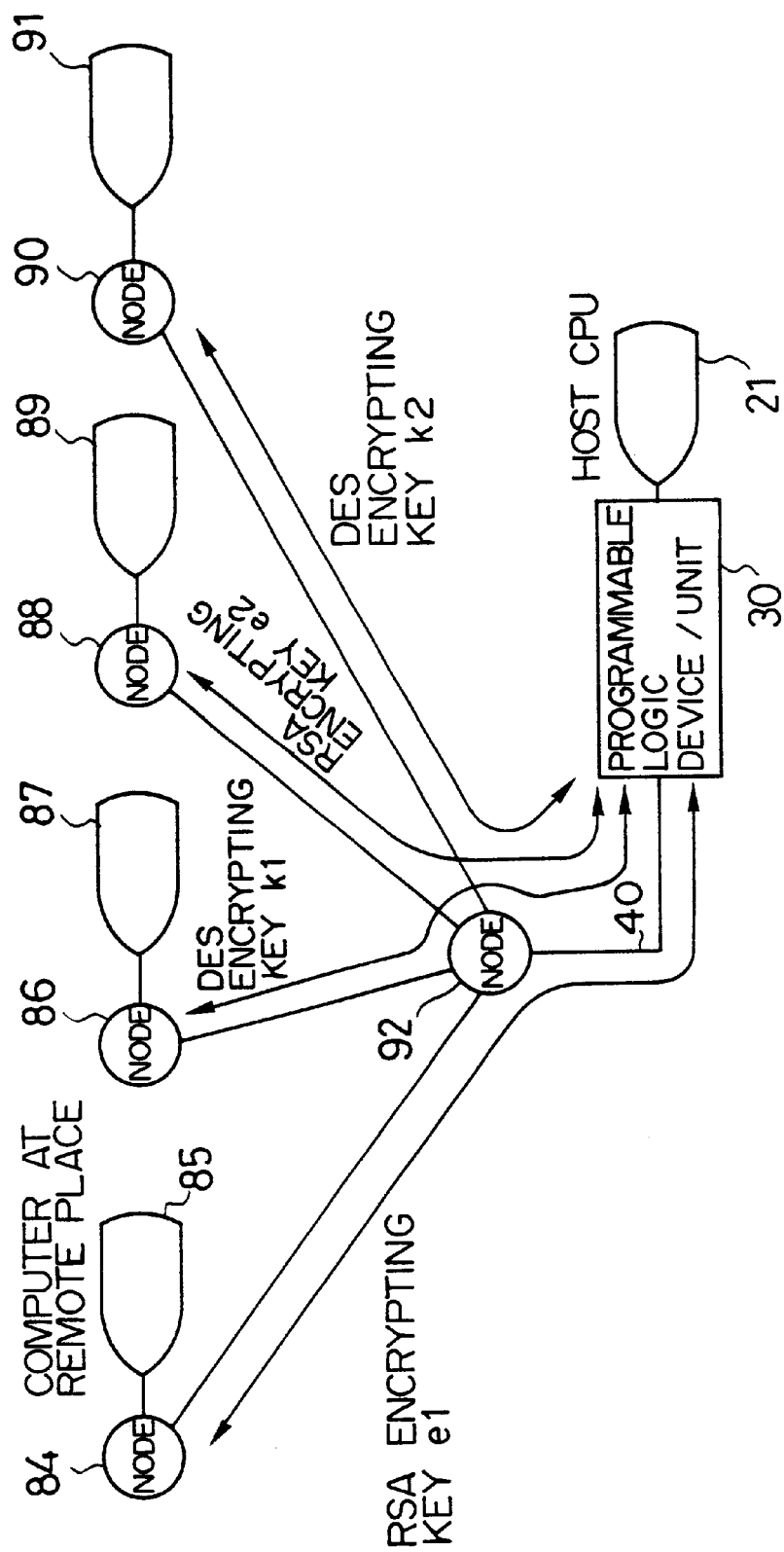
FIG. 16 is a schematic diagram showing a changing method for specifications corresponding to the degree of security.

FIG. 16 is a schematic diagram showing a method for updating the specifications of the encrypting/decrypting system corresponding to the degree of security of data to be encrypted. In FIG. 16, a programmable logic device/unit 30 is connected to computers 85, 87, 89, and 91 at remote places through a network 40. Nodes 84, 86, 88, 90, and 92 are relaying computers, repeaters, and so forth disposed on the network 40.

To further improve the security, in the encrypting/decrypting system, a plurality of algorithms and a plurality of keys have been prepared. Depending on the data transmission path and the degree of security required, the type of the algorithm and the type of key are changed.

In this example, the host CPU 21 uses an RSA algorithm and an encrypting key e1 for communication with the computer 85, a DES algorithm and an encrypting key k1 for communication with the computer 87, an RSA algorithm and an encrypting key e2 for communication with the computer 89, and a DES algorithm and an encrypting key k2 for communication with the computer 91.

With such a system, the specifications of the encrypting/decrypting system can be changed corresponding to the safety grade of the communication path, the degree of security of data, and so forth. Thus, cryptograms can be more securely protected against unauthorized people.

Figure 17:
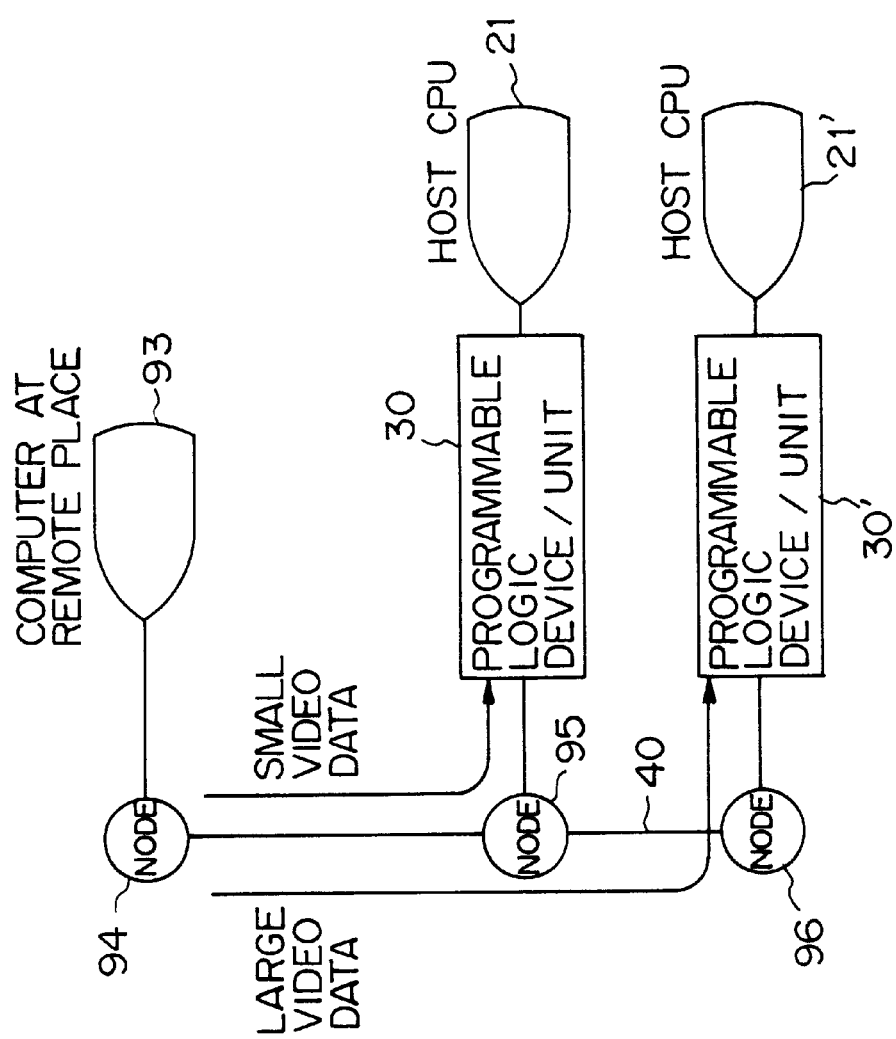
FIG. 17 is a schematic diagram showing a changing method for specifications corresponding to a process speed.

FIG. 17 is a schematic diagram showing a method for changing the specifications of the encrypting/decrypting system corresponding to a required process speed. In FIG. 17, programmable logic devices/units 30 and 30' are connected to a computer 93 at a remote place through a network 40. Nodes 94, 95, and 96 are relaying computers, repeaters, and so forth disposed on the network 40. A host CPU 21 is connected to the programmable logic device/unit 30. A host CPU 21' is connected to the programmable logic device/unit 30'.

When data to be encrypted has a large information amount such as video data, the bit length of the key and the number of stages of the DES algorithm are changed corresponding to the amount of data and the required process speed. Thus, the process of the programmable logic device/unit 30 for small video data and the process of the programmable logic device/unit 30' for large video data can be completed in a predetermined time period.

In the systems shown in FIGS. 14 to 17, change data necessary for changing the specifications of the encrypting/decrypting system can be encrypted and sent from the computers 81, 85, 87, 89, and 91 at remote places to the host CPUs 21 and 21'.

In this case, the computers 81, 85, 87, 89, and 91 at remote places are connected to for example the encrypting/decrypting system according to the present invention so as to encrypt the change data. The received encrypted change data is decrypted by the programmable logic devices/units 30 and 30'. Corresponding to the change data, the specifications of the encrypting/decrypting system are changed. Thus, by exchanging encrypted change data, unauthorized people cannot know the fact of the change of specifications and updated specifications.

In the above-described embodiment, systems using the DES algorithm and the RSA algorithm were exemplified. However, the present invention is not limited to such systems. Instead, the encrypting/decrypting system according to the present invention can instal another encrypting/decrypting algorithm. In addition, the setup data can be changed corresponding to the algorithm. For example, the file name of the hardware description language library 26 for use can be included in the setup data.

According to the present invention, an encrypting/decrypting system that flexibly operates at high speed can be accomplished. Thus, an encrypting/decrypting system that can process large data and an encrypting/decrypting system that can operate on real-time basis can be customized by the end user corresponding to the degree of security and application for use or automatically formed.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An encrypting apparatus connectable via a communication network to a remote computer disposed at a remote place, comprising:
    a circuit unit, having at least one programmable logic device, to form an encrypting circuit with the programmable logic device corresponding to given encrypting specifications;
    a network connecting unit to connect said encrypting apparatus to the communication network;
    a mapping data generating unit to read change data for changing at least one of the encrypting specifications in accordance with predetermined criteria received from the remote computer via the communication network, and to generate a mapping data object representing the structure of the encrypting circuit;
    a changing unit, coupled to said circuit unit and said change data generating unit, to change automatically a structure of the encrypting circuit corresponding to the mapping data object by changing a circuit structure of the programmable logic device without removal from said encrypting apparatus; and
    an enclosure substantially surrounding said circuit unit, said network connecting unit, said mapping data generating unit and said changing unit.

2. The encrypting apparatus as set forth in claim 1,
    wherein said changing unit includes a configuration unit to write the mapping data object to the programmable logic device,
    wherein said mapping data generating unit reads an existing mapping data object, and wherein said configuration unit writes the existing mapping data object.

3. The encrypting apparatus as set forth in claim 1, wherein said mapping data generating unit includes a compiler unit to generate the mapping data object by compiling a library written in a hardware description language, wherein said changing unit includes a configuration unit to write the mapping data object to the programmable logic device, and wherein said mapping data generating unit reads the change data from an existing library, compiles the existing library to obtain the mapping data object, and changes the encrypting circuit using the mapping data object.

4. The encrypting apparatus as set forth in claim 1, wherein said mapping data generating unit includes:

a database unit to store an encrypting algorithm file having a predetermined encrypting algorithm, and a compiler unit to generate a mapping data object by compiling a library written in a hardware description language, wherein said changing unit includes a configuration unit for writing the mapping data object to the programmable logic device; and wherein said mapping data generating unit receives the change data from outside said encrypting apparatus, retrieves a relevant encrypting algorithm file and changes the encrypting circuit with the library in the relevant encrypting algorithm file, corresponding to setup data given as the change data.

5. The encrypting apparatus as set forth in claim 1, wherein said changing unit changes the encrypting specifications corresponding to at least one of a communication path of data to be encrypted, a degree of security thereof, and a process speed required therefor.

6. The encrypting apparatus as set forth in claim 1, wherein said network connecting unit receives encrypted change data from the communication network, and said mapping data generating unit generates the encrypting circuit using the encrypted change data.

7. The encrypting apparatus as set forth in claim 1, wherein said changing unit periodically updates the encrypting specifications.

8. The encrypting apparatus as set forth in claim 1, wherein said changing unit updates the encrypting specifications corresponding to an external command.

9. A decrypting apparatus connectable via a communication network to a remote computer disposed at a remote place, comprising:

a decrypting unit in which circuit connections for decrypting data can be changed corresponding to an external command;

a network connecting unit to connect the decrypting apparatus to the communication network; and a changing unit for changing the circuit connections of said decrypting unit corresponding to specifications of a decrypting algorithm, read from the computer when the specifications are changed.

10. A decrypting apparatus connectable via a communication network to a remote computer disposed at a remote place, comprising:

a circuit unit, having at least one programmable logic device, to form a decrypting circuit with the programmable logic device corresponding to given decrypting specifications;

a network connecting unit to connect said decrypting apparatus to the communication network;

a mapping data generating unit to read change data for changing at least one of the decrypting specifications in accordance with predetermined criteria received from the remote computer via the communication network, and to generate a mapping data object representing the structure of the decrypting circuit;

a changing unit, coupled to said circuit unit and said change data generating unit, to change automatically a structure of the decrypting circuit corresponding to the mapping data by changing a circuit structure of the programmable logic device without removal from said decrypting apparatus; and an enclosure substantially surrounding said circuit unit, said mapping data generating unit and said changing unit.

11. The decrypting apparatus as set forth in claim 10, wherein said changing unit includes a configuration unit to write the mapping data object to the programmable logic device, wherein said mapping data generating unit reads an existing mapping data object, and wherein said configuration unit writes the existing mapping data object.

12. The decrypting apparatus as set forth in claim 10, wherein said mapping data generating unit includes a compiler unit to generate a mapping data object by compiling a library written in a hardware description language, and wherein said changing unit includes a configuration unit to write the mapping data object to the programmable logic device, and wherein said mapping data generating unit reads the change data from an existing library, compiles the existing library to obtain the mapping data object, and changes the decrypting circuit using the mapping data object.

13. The decrypting apparatus as set forth in claim 10, wherein said mapping data generating unit includes:

a database unit to store a decrypting algorithm file having a predetermined decrypting algorithm, and a compiler unit to generate a mapping data object by compiling a library written in a hardware description language, wherein said changing unit includes a configuration unit for writing the mapping data object to the programmable logic device; and wherein said mapping data generating unit receives the change data from outside said decrypting apparatus, retrieves a relevant decrypting algorithm file and changes the decrypting circuit with the library in the relevant decrypting algorithm file, corresponding to setup data given as the change data.

14. The decrypting apparatus as set forth in claim 10, wherein said changing unit changes the decrypting specifications corresponding to at least one of a communication path of data to be decrypted, a degree of security thereof, and a process speed required therefor.

15. The decrypting apparatus as set forth in claim 10, wherein said network connecting unit receives decrypted change data from the communication network, and wherein said mapping data generating unit changes the decrypting circuit corresponding to the decrypted change data.

16. The decrypting apparatus as set forth in claim 10, wherein said changing unit periodically updates the decrypting specifications.

17. The decrypting apparatus as set forth in claim 10, wherein said changing unit updates the decrypting specifications corresponding to an external command.

18. An encrypting apparatus connectable via a communication network to a remote computer disposed at a remote place, comprising:
   an encrypting unit in which circuit connections for encrypting data can be changed in response to an external command;
   a network connecting unit to connect the encrypting apparatus to the communication network; and
   a changing unit for changing the circuit connections of said encrypting unit corresponding to specifications of an encrypting algorithm, read from the remote computer when the specifications are changed.

19. A signal processing apparatus connectable via a communication network to a remote computer disposed at a remote place, comprising:
   circuit means, having at least one programmable logic device, for forming a circuit corresponding to given specifications;
   mapping data generating means for reading change data from the remote computer via the communication network, for changing the specifications of the circuit in accordance with predetermined criteria and for generating a mapping data object representing the structure of the circuit, the change data representing one of encrypting specifications or decrypting specifications;
   changing means for automatically changing a structure of the circuit corresponding to the mapping data object; and
   an enclosure substantially surrounding said circuit means, said mapping data generating means and said changing means.

20. An encryption processing system for use with a communication system for exchanging encrypted data through a communication network connected to a remote computer at a remote location, comprising:
   encrypting circuit means, having at least one programmable logic device, for forming an encrypting circuit corresponding to given encrypting specifications;
   encryption mapping data generating means for reading encryption change data from the remote computer via the communication network, for changing the encrypting specifications in accordance with predetermined criteria and for generating an encryption mapping data object representing the structure of the encrypting circuit;
   encryption changing means for changing the encrypting specifications and automatically changing a structure of the encrypting circuit corresponding to the encryption mapping data object;
   decrypting circuit means, having at least one programmable logic device, for forming a decrypting circuit corresponding to given decrypting specifications;
   decryption mapping data generating means for reading decryption change data from the remote computer via the communication network, for changing the decrypting specifications in accordance with the predetermined criteria and for generating a decryption mapping data object representing the structure of the decrypting circuit;
   decryption changing means for changing the decrypting specifications and automatically changing a structure of the decrypting circuit corresponding to the decryption mapping data object; and
   an enclosure substantially surrounding said encryption and decryption circuit means, said encryption and decryption mapping data generating means and said encryption and decryption changing means.

21. An encrypting apparatus connectable via a communication network to a remote computer disposed at a remote place, comprising:
   encrypting means, composed of an unit of which circuit connections for encrypting data can be changed corresponding to an external command, for encrypting data;
   mapping data generating means for reading change data from the remote computer via the communication network to change encrypting specifications in accordance with predetermined criteria and for generating a mapping data object representing the structure of the circuit connections;
   changing means for changing the circuit connections of said encrypting means corresponding to the encrypting specifications of the encrypting algorithm only when the encrypting specifications are changed based on the mapping data object; and
   an enclosure substantially surrounding said encrypting means, said mapping data generating means and said changing means.

22. A decrypting apparatus connectable via a communication network to a remote computer disposed at a remote place, comprising:
   decrypting means, composed of an unit of which circuit connections for decrypting data can be changed corresponding to an external command, for decrypting data;
   mapping data generating means for reading change data from the remote computer via the communication network to change decrypting specifications in accordance with predetermined criteria and for generating a mapping data object representing the structure of the circuit connections;
   changing means for changing the circuit connections of said decrypting means corresponding to the decrypting specifications of the decrypting algorithm only when the decrypting specifications are changed based on the mapping data object; and
   an enclosure substantially surrounding said encrypting means, said mapping data generating means and said changing means.

23. An encrypting method, comprising:
   forming an encrypting circuit corresponding to given encrypting specifications with at least one programmable logic device;
   reading change data from a remote computer via a communication network, for changing the encrypting specifications; and
   automatically generating change data for changing the encrypting specification; and
   automatically changing a circuit structure of the at least one programmable logic device corresponding to the change data without removal of the at least one programmable logic device from the encrypting circuit.

24. A decrypting method, comprising:
   forming a decrypting circuit corresponding to given decrypting specifications with at least one programmable logic device;
   reading change data from a remote computer via a communication network, for changing the decrypting specifications;
   automatically generating change data for changing the decrypting specification; and automatically changing a circuit structure of the at least one programmable logic device corresponding to the change data without removal of the at least one programmable logic device from the decrypting circuit.

25. A signal processing method, comprising:

forming a circuit corresponding to given specifications with at least one programmable logic device;

automatically generating change data for changing the specifications of the circuit, the specifications representing one of encrypting specifications or decrypting specifications; and reading the change data from a remote computer via a communication network, and automatically changing a structure of the circuit corresponding to the change data.

26. An encrypting apparatus connectable via a communication network to a remote computer disposed at a remote place, comprising:

a circuit unit, having at least one programmable logic device, to form an encrypting circuit with the programmable logic device corresponding to given encrypting specifications;

a network connecting unit to connect said encrypting apparatus to the communication network; and a changing unit to read change data from the remote computer for changing the encrypting specifications, and automatically to change the encrypting circuit corresponding to the change data.

27. A decrypting apparatus connectable via a communication network to a remote computer disposed at a remote place, comprising:

a circuit unit, having at least one programmable logic device, to form a decrypting circuit with the programmable logic device corresponding to given decrypting specifications;

a network connecting unit to connect said decrypting apparatus to the communication network; and a changing unit to read change data from the remote computer for changing the decrypting specifications, and automatically to change the decrypting circuit corresponding to the change data.

28. A signal processing apparatus connectable via a communication network to a remote computer disposed at a remote place, comprising:

a circuit unit, having at least one programmable logic device, for forming a circuit corresponding to given specifications;

a network connecting unit to connect said signal processing apparatus to the communication network; and a changing unit to read change data from the remote computer for changing the specifications of the circuit, the change data representing one of encrypting specifications and decrypting specifications, and automatically to change the circuit corresponding to the change data.

29. An encryption processing system for use with a communication system for exchanging encrypted data through a communication network connected to a remote computer disposed at a remote place, comprising:

an encrypting circuit unit, having at least one programmable logic device, to form an encrypting circuit corresponding to given encrypting specifications;

an encryption changing unit to read encryption change data from the remote computer for changing the encrypting specifications, and automatically to change the encrypting circuit corresponding to the encryption change data;

a decrypting circuit unit, having at least one programmable logic device, to form a decrypting circuit corresponding to given decrypting specifications; and a decryption changing unit to read decryption change data from the remote computer for changing the decrypting specifications, and automatically to change the decrypting circuit corresponding to the decryption change data.

* * * * *